United States Patent

Walker et al.

[11] Patent Number: 5,963,891
[45] Date of Patent: Oct. 5, 1999

[54] SYSTEM FOR TRACKING BODY MOVEMENTS IN A VIRTUAL REALITY SYSTEM

[75] Inventors: Chris Walker, Venice; Babak Beheshti, Santa Monica, both of Calif.

[73] Assignee: Modern Cartoons, Ltd., Venice, Calif.

[21] Appl. No.: 08/847,447

[22] Filed: Apr. 24, 1997

[51] Int. Cl.$^6$ .................................................. G01L 1/00
[52] U.S. Cl. .................. 702/150; 73/379.03; 73/379.05; 345/959
[58] Field of Search .............................. 702/94, 95, 150, 702/151, 152, 253; 364/578; 395/80; 348/121; 434/29, 247; 345/952, 953, 959; 73/379.01, 379.03, 379.05, 379.09

[56] References Cited

U.S. PATENT DOCUMENTS

| | | |
|---|---|---|
| 4,945,305 | 7/1990 | Blood . |
| 5,184,319 | 2/1993 | Kramer .................................... 364/806 |
| 5,320,538 | 6/1994 | Baum ....................................... 434/307 |
| 5,323,174 | 6/1994 | Klapman et al. ........................ 345/156 |
| 5,337,758 | 8/1994 | Moore et al. . |
| 5,375,610 | 12/1994 | LaCourse et al. ...................... 128/782 |
| 5,429,140 | 7/1995 | Burdea et al. ........................... 128/774 |
| 5,442,729 | 8/1995 | Kramer et al. ........................... 395/2.8 |
| 5,513,130 | 4/1996 | Redmond ................................. 364/578 |
| 5,526,022 | 6/1996 | Donahue et al. ........................ 345/156 |
| 5,583,478 | 12/1996 | Renzi .................................... 340/407.1 |
| 5,600,330 | 2/1997 | Blood . |
| 5,600,777 | 2/1997 | Wang et al. ............................. 395/326 |
| 5,610,528 | 3/1997 | Neely et al. ............................ 324/660 |
| 5,631,861 | 5/1997 | Kramer .................................... 364/406 |
| 5,676,157 | 10/1997 | Kramer .................................... 128/782 |
| 5,762,612 | 6/1998 | Campbell ................................ 600/558 |
| 5,807,114 | 9/1998 | Hodges et al. .......................... 434/236 |
| 5,813,406 | 9/1998 | Kramer et al. .......................... 128/782 |
| 5,819,206 | 10/1998 | Horton et al. ........................... 702/150 |

OTHER PUBLICATIONS

Singh et al., "Human Figure Synthesis and Animation for Virtual Space Teleconferencing", IEEE, 1995.

Bergamasco, "Real time Animation of a Virtual Arm and its Collissions with a Virtual Environment", Abstract only, IEEE, 1996.

Semwal et al., "Closed Form and Geometric Algorithms for Real–Time Control of an Avatar", IEEE, 1996.

*Primary Examiner*—Patrick Assouad
*Attorney, Agent, or Firm*—Kenneth L. Sherman, Esq.; Sherman & Sherman

[57] ABSTRACT

A system is provided for tracking body movements, including subtle body movements, in a virtual reality system and for integrating data generated therefrom into a virtual reality system in real tine. The system of the preferred embodiment of the present invention includes a data generating body suit having a plurality of movement indicating sensors secured thereto at a number of predetermined positions for determining movements of the wearer. Any movement by the wearer generates data that is transmitted to a computer for processing the data in real time. The data suit includes sensors for determining body position and orientation and sensors for accurately tracking subtle body movements such as movements of the wrist. Bend sensors include elongated portions that traverse an articulation to be monitored. Any movement of a monitored articulation causes flexure of the elongated portion, which in turn causes the sensors to generate signals indicating flexure of the sensor and degree of flexure to indicate body movement. A plurality of bend sensors are included for monitoring the articulations of the arm and for monitoring foot movement. Signals generated by the bend sensors are transmitted to a data processing unit located on the data suit for processing the signals prior to transmitting the signals to a computer. The signals generated by sensors are processed for controlling a program, such as a virtual reality program in real time.

23 Claims, 6 Drawing Sheets

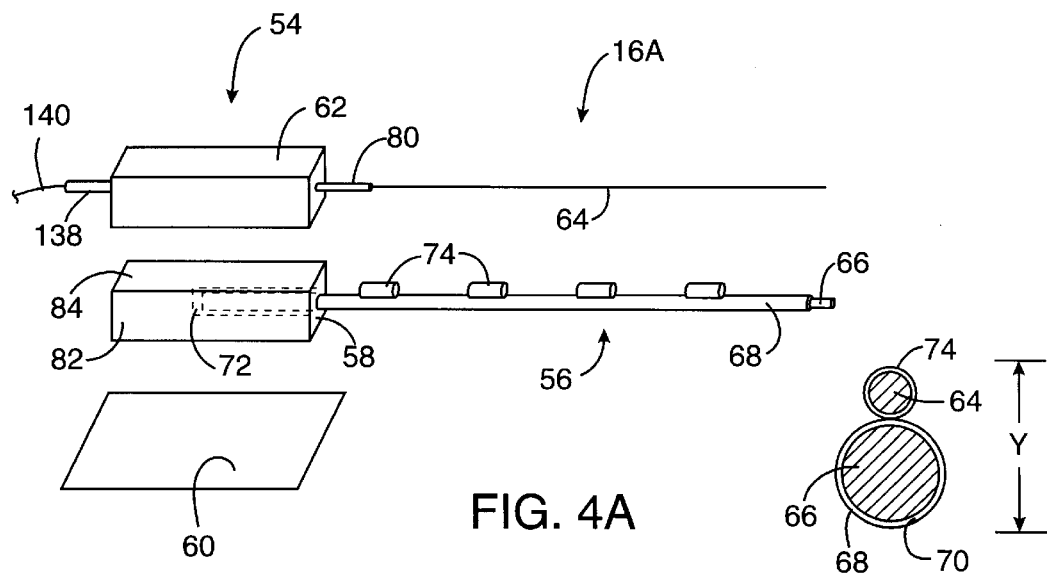
FIG. 4A
FIG. 4B
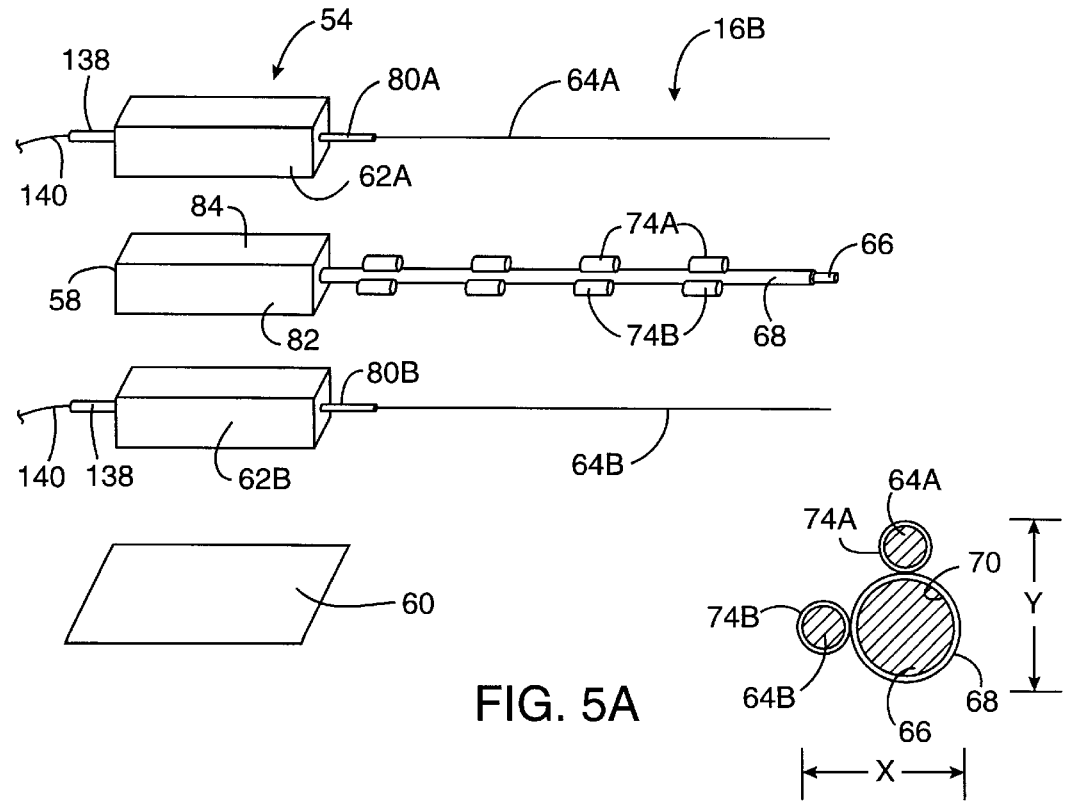
FIG. 5A
FIG. 5B

SYSTEM FOR TRACKING BODY MOVEMENTS IN A VIRTUAL REALITY SYSTEM

BACKGROUND OF THE INVENTION

1. Field of the Invention

The present invention relates generally to data entry and manipulation devices for computers, and more particularly, to a system for a tracking body movements in a virtual reality system and for integrating data generated by the device into a virtual reality system in a real time environment.

2. Description of Related Art

Virtual reality systems are computer based systems that provide experiences to a participant acting in a simulated environment that forms a three dimensional virtual world. These systems are used in several different applications such as commercial flight simulators, entertainment systems, computer games and video arcade games to name a few.

In virtual reality systems, the participant typically wears a head-mounted device that enables viewing of a virtual reality world generated by the computer. The system also includes an interaction means, such as a pointing device or specially configured glove containing sensors and actuators, for interacting with objects in the virtual world. In somewhat sophisticated systems, a data generating body suit, containing sensors and actuators, may be provided so that the user can influence and has a realistic feel of objects in the virtual world.

Computer generated animation is an increasingly prevalent media form. Computer generated animation is currently being used in such applications as full-length motion pictures, crime reenactments, short length films, television commercials, and children's cartoons. However, a disadvantage of known computer generated animation, is that the animation is programmed into the computer to form a cartoon or other animation, similar to a draftsman drawing cells in a cartoon strip, prior to the animation being run for display. It is not possible for a user to interact with the computer animation while the animation is being shown, such as controlling the movement of characters or objects. It would be advantageous to provide a system for interacting with computer generated animation in "real time", i.e., while the animation is running on a computer where the participant can control objects in the animation.

One means for controlling an object, such as the body movements of a selected character or characters in real time computer generated animation, would be to provide a data input means or a data generating body suit which would provide appropriate data to the computer while the animation program is running. The data generated by the suit can be transmitted to a computer for integration into the running animation for altering the animation in real time.

Devices have been provided for use in virtual reality systems that measure relative position and orientation of a body in space, and then transmit relative data to a computer for processing the data. These devices typically include a body suit that has a number of sensors, or receivers. A transmitter sends signals to the receivers for determining position and orientation in space. The signal is received and processed to determine the position and orientation of the body suit. This information is used to control the movements of an object, such as a character, in a virtual reality program. The object behaves in a manner controlled by the body movements of the wearer of the suit, such as the character mimicking the body movements of the wearer.

One such device is disclosed in U.S. Pat. No. 4,945,305, to Blood. The device disclosed therein quantitatively measures the position of receiver antennae relative to transmitter antennae. The device includes transmitter antennae and receiver antennae which detect the DC magnetic vectors generated by the transmitters. A signal processor is provided to ascertain the magnitude of the detected DC magnetic vectors, to quantitatively compute the relative position and orientation of the receiver antennae relative to the transmitter antennae, and to compensate for the effects of the earth's magnetic field on the operation of the device.

U.S. Pat. No. 5,600,330, to Blood, discloses a device for determining position and orientation of receiving antenna with respect to transmitting antenna using electromagnetic fields. The device includes transmitting means for transmitting electromagnetic fields and receiving means for receiving the transmitted electromagnetic fields. The receiving means is disposed inside a volume of space where non-dipole field conditions exits.

U.S. Pat. No. 5,337,758, to Moore et al., is directed to a spine motion analyzer and method. The disclosed spine analyzer includes mechanical linkage attached to a subject below and above the portion of the spine to be monitored. Transducers are connected to the linkage to provide electrical signals that can be processed to provide video, printed, and auditory indications of the spinal movements.

A disadvantage of the above systems is that they are directed to measuring only general body position and orientation. These describe the general location of a wearer of the receiving means relative to the transmitting means, or the wearer bending over or rotating their entire torso relative to the transmitting means. While these devices are capable of measuring significant body movements, they are not well suited for accurately tracking subtle body movements, such as wrist movements or rotation of a foot, for example.

Thus, there exists a need for a system for a tracking body movements, and particularly subtle body movements, in a virtual reality system and for integrating data generated by the device into a virtual reality system in a real time environment.

OBJECTS OF THE INVENTION

It is therefore an object of the present invention to provide a system for tracking body movements in a virtual reality system;

It is another object of the present invention to provide a system for tracking body movements in a virtual reality system that accurately tracks subtle body movements; and It is a further object of the present invention to provide a system for tracking body movements in a virtual reality system and integrating the data generated by the device into a virtual reality system in real time.

SUMMARY OF THE INVENTION

These and other objects and advantages of the present invention are achieved by providing a system for tracking body movements, and particularly subtle body movements, in a virtual reality system and for integrating data generated by the invented system into a virtual reality system in real time. The system of the preferred embodiment of the present invention includes a data generating body suit having a plurality of movement indicating sensors which are secured at a number of predetermined positions to determine movements of the wearer. Any movement by the wearer, including wrist, arm, and foot movements, generates data indicative of the movement and controls an object in a program running on a computer.

The data is transmitted to the computer for processing in real time within a virtual reality program. The movement indicating data is continuously processed by the computer so that an object, such as a cartoon figure or character in a virtual reality program, has bodily movements that substantially mimic the movements of the wearer. The data generated by the wearer's movements may be used to control cartoon characters which mimic an actor's performance in "real time" or any desired object as determined by the program.

The preferred embodiment of the invented system integrates a plurality of different groups of sensors for sensing the movements of a wearer wearing the data suit. In the preferred embodiment, a first group of sensors generates data to determine body position and orientation of the suit to generally control the position and orientation of an object, or character in a virtual reality scene, for example.

The first group of sensors may include known magnetic body position and orientation sensors, or receivers, and suitable transmitters. The first group of position and orientation sensors may use a system such as the known 6 degree of freedom system disclosed in U.S. Pat. No. 4,945,305, incorporated herein in its entirety by reference. The first group of position and orientation sensors are affixed to the data suit at a number of preferred locations. These locations include a sensor positioned on the sacral region of the wearer's back, a sensor positioned on the lateral region of the lower leg of the wearer, and a sensor positioned on each of the wearer's elbows.

A second group of sensors are bend sensors which accurately track body movements, and particularly subtle body movements, of the wearer's body. These movements may include rotation of the wrist relative to the forearm or rotation of the foot about the ankle. In the preferred embodiment, the subtle movement bend sensors are affixed to the suit at a number of different selected positions for monitoring movements of desired articulations of the body. The bend sensors include elongated sensing means that traverse an articulation, of an appendage, for example, to monitor the movement of the articulation. The bend sensors are coupled to transducers that provide electrical signals that correspond to flexure of the sensors.

In the preferred embodiment, a plurality of bend sensors are positioned on each arm, for monitoring the movements of the arm. Preferably, a pair of bend sensors are provided for monitoring movements of each elbow, a second pair of sensors are provided for monitoring wrist rotation, and a third pair of sensors are provided for sensing flexion of each wrist. Bend sensors of the invented system are also provided for monitoring the complex movements of the foot about the ankle.

In the preferred embodiment of the present invention, three different types of bend sensors are provided for monitoring body movements. A first type of bend sensor, referred to as a single axis bend sensor, is provided to monitor extension and flexion type body movements. The single axis bend sensor includes a plate secured to the suit. A movement sensing cable is secured to a support cable that is mounted on the plate. The sensing cable is coupled to a transducer which indicates flexure of the cable, and thus movement of the body region being monitored by the sensor.

In the preferred embodiment, single axis bend sensors are affixed to the suit along the lateral side of the elbow and traverse the lateral side of the wrist. The bend sensors monitoring elbow movement are positioned on the suit so that the sensing cables traverse the elbow articulation along its lateral aspect. The bend sensor monitoring the wrist is positioned on the suit so that the sensing cable traverses the wrist. The sensing cable extends from the ulnar region of the forearm, traverses the wrist, and terminates along the ulnar border of the palm of the hand.

Movement of the monitored articulations, such as movement of the forearm relative to the upper arm, causes flexure of the sensing cable. Any flexure of the sensing cable causes the cable to actuate the transducer to transmit signals indicating the degree of flexure of the sensor cable.

A second type of bend sensor, referred to as a two axis bend sensor, is coupled to the leg and foot and traverses the ankle articulation in the preferred embodiment. The two axis bend sensor includes a pair of transducers secured to a housing mounted on a plate. A sensing cable is coupled to each transducer. Each cable traverses the medial region, or inside region, of the ankle and foot. The first sensing cable monitors flexion and extension movements of the foot, such as when the wearer is walking, and the second sensing cable monitors medial and lateral articulations of the foot about the ankle, such as when the wearer moves their foot inward or outward. Both of the sensing cables are mounted to a single support cable, in a similar fashion as the single axis bend sensor. The support cable is secured in the housing.

A third type of sensor used in the preferred embodiment of the present invention, referred to as a twist sensor, monitors wrist rotation. The twist sensor includes a planar blade portion coupled to a voltage varying device, such as a potentiometer, via a flexible connecting member. The twist sensor is oriented along the dorsal region of the forearm. The blade portion is positioned proximal to the wrist of the wearer. The potentiometer is mounted on a plate secured to the suit. Rotation of the wrist, such as supination and pronation, rotates the blade of the twist sensor, and adjusts the potentiometer to provide signals of varying amplitude which indicate the amount of rotation of the wrist.

In the preferred embodiment of the present invention, the bend sensors and twist sensors accurately track subtle movements in each of the monitored articulations. Flexure of the sensing cables causes the cables to actuate the transducers and generates signals indicating movement. As the flexure of the sensing cables increases, the cables actuate the transducers to generate signals of increasing amplitude. When the flexure of the cables is maintained, the amplitude of the signals stabilizes to indicate that the position of the monitored articulation is unchanged. Any further flexure of the cables, such as increasing or decreasing the flexure of the cables, causes the amplitude of the signals transmitted by the transducers to change correspondingly, and generate data that accurately depicts the position of the articulation.

In addition to the aforementioned body position and orientation sensors, and the bend sensors, the preferred embodiment of the present invention uses a third group of sensors which are pressure sensors provided to determine when the wearer's feet are touching the ground, to determine if the wearer is walking or standing. These pressure sensors are preferably provided in specially designed boots and are positioned in the heel of the boot. When the wearer is walking, the heel of their foot impacts the pressure sensor and causes the sensor to transmit signals at intervals indicating that the wearer is walking.

In the preferred embodiment of the present invention, the bend sensors and pressure sensors are connected to a data collecting unit, which is preferably secured to the back of the data suit. The data collecting unit receives signals generated by each of the bend sensors and pressure sensors and processes the signals for transmitting movement indicating data to a recipient computer. The data collection unit preferably includes a low-pass filter for removing noise in the signals received from the sensors.

An analog-to-digital signal converter is also provided for obtaining a representative data value for each of the signals generated by the bend and pressure sensors. After conversion, the data is normalized to provide signals indicating actual movement of the articulations of the wearer and to calibrate the sensors to accommodate for varying ranges of motion, for example, of different wearers of the invented data suit. The normalized data is transmitted to the data collection or recipient computer at a high rate of transmission for further processing.

Simultaneously, the data from the position and orientation sensors is received by a processing computer for determining the position and orientation of the wearer. The signals are processed by the processing computer to generate data indicating the position and orientation of the wearer.

The data from the data collection unit is fed into a main computer for processing while the position and orientation data is also processed. The data is processed and fed in real time to control a program, such as a virtual reality program, running on the computer. Thus, the plurality of movement indicating sensors of the preferred embodiment of the invented system generate and transmit data indicative of any movements of the wearer. Movements by the wearer, including wrist, arm, and foot movements are transmitted to the main computer for processing data generated by the suit in real time. The movement indicating data is continuously processed so that an object, such as a character in a virtual reality program running on the computer, has corresponding real time movements analogous to the movements of the wearer, such as an actor.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 4A is an exploded view of a first type of bend sensor of the preferred embodiment of the present invention;

FIG. 4B is a cross-sectional view of the first type of bend sensor of the preferred embodiment of the present invention;

FIG. 5A is an exploded view of a second type of bend sensor of the preferred embodiment of the present invention;

FIG. 5B is a cross-sectional view of the second type of bend sensor of the preferred embodiment of the present invention;

DESCRIPTION OF THE PREFERRED EMBODIMENTS

The following description is provided to enable any person skilled in the art to make and use the invention and sets forth the best modes presently contemplated by the inventors of carrying out their invention. Various modifications, however, will remain readily apparent to those skilled in the art since the generic principles of the present invention have been defined herein.

Figure 1:
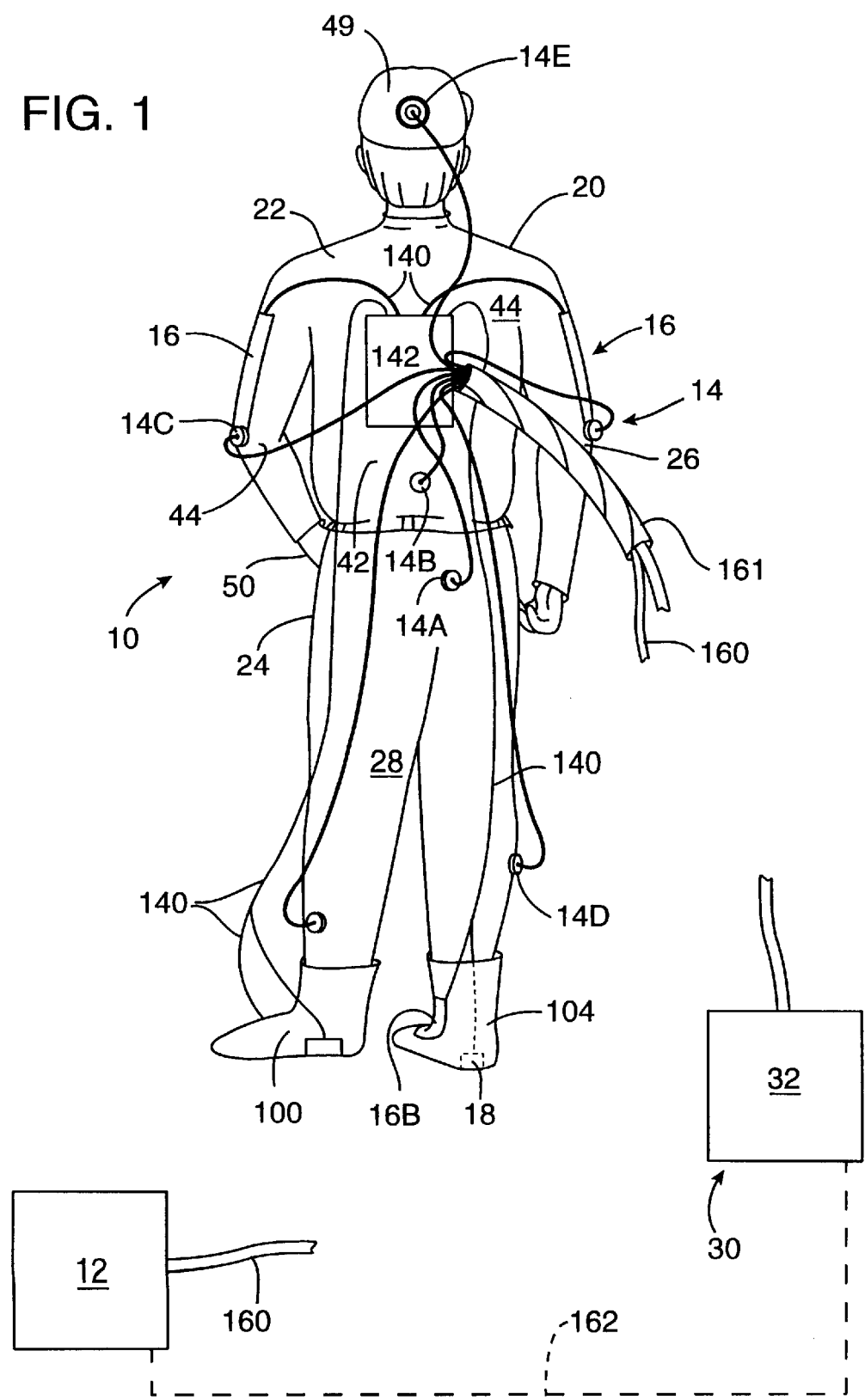
FIG. 1 is a rear view showing a wearer wearing a system for tracking body movements of the preferred embodiment of the present invention.
Figure 2:
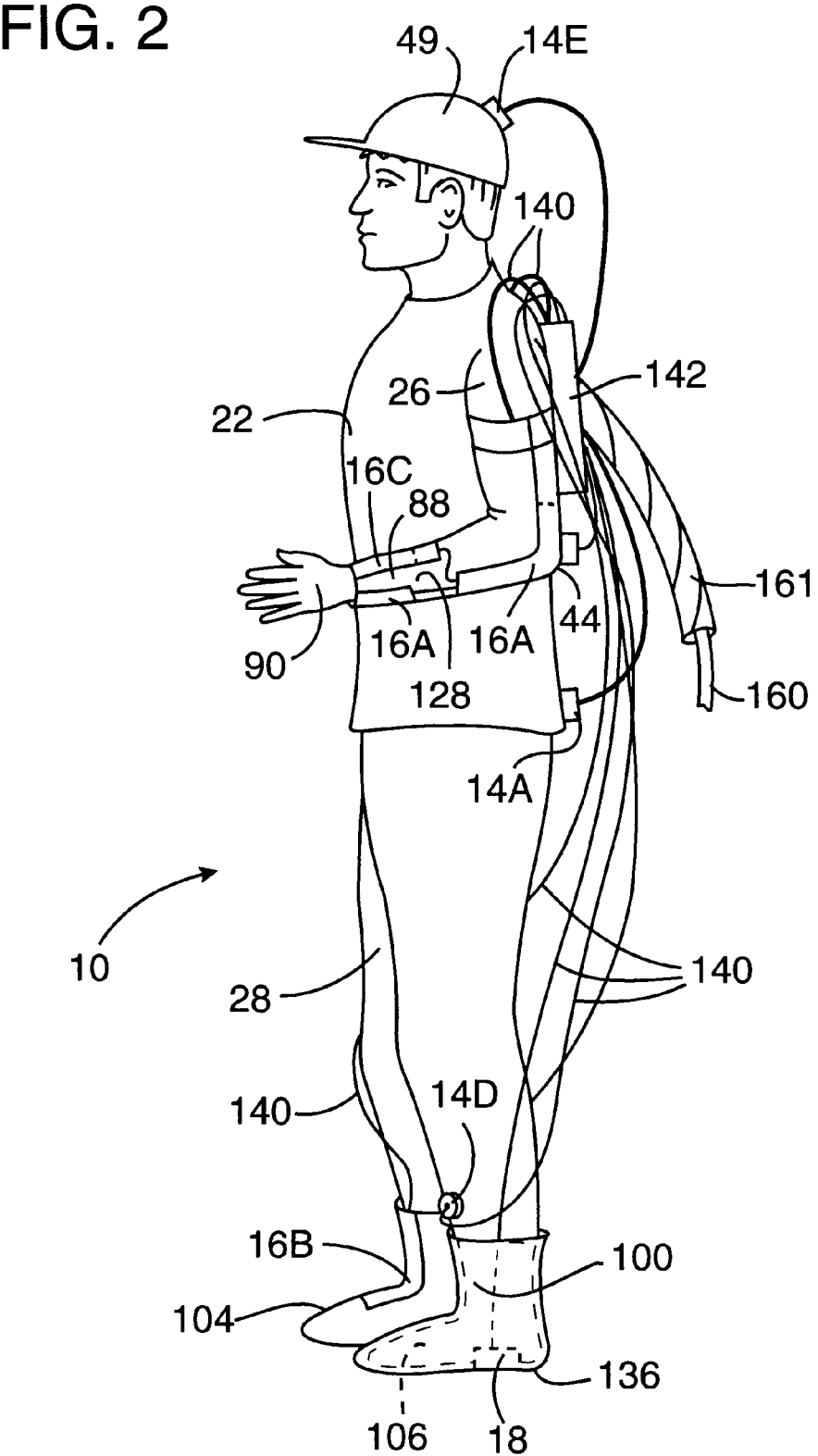
FIG. 2 is side elevational view showing the body suit of the preferred embodiment of the present invention on the wearer.

Referring now to FIG. 1 and FIG. 2 of the drawings there is shown, generally at 10, a preferred embodiment of a system for a tracking body movements, constructed according to the principles of the present invention. The preferred embodiment of the invented system 10 accurately tracks body movements, and particularly subtle body articulations, and generates data indicative of the movements. Data generated by the system 10 can be integrated into a main computing means 12, such as a computer running a virtual reality program, or any other appropriate desired application.

The movement indicating data generated by the preferred embodiment of the invented system 10 can be integrated into a program running on the main computer 12 in real time, for modifying the program while the program is being displayed. In the preferred embodiment, the movement indicating data output by the invention 10 is continuously transmitted to the computer 12, for processing so that an object, such as a cartoon figure or character in a virtual reality program, will have bodily movements that substantially mimic the movements of the wearer of the body suit 10, such as an actor, as the wearer is performing.

The system of the preferred embodiment of the present invention includes a data generating body suit 10 that integrates a plurality of different groups of sensors 14, 16, 18 for sensing the movements of a wearer 20. The first group of sensors 14 is provided for determining the position and orientation of the wearer 20 in space, the second group of sensors 16 is provided for monitoring flexure of the articulations of the wearer 20, and the third group of sensors 18 is provided for determining when the wearer 20 is walking or standing. Thus movement by the wearer 20, including wrist, arm, and foot articulations for example, generates data indicative of the movement, for manipulating a program running on the computer 12.

Figure 3:
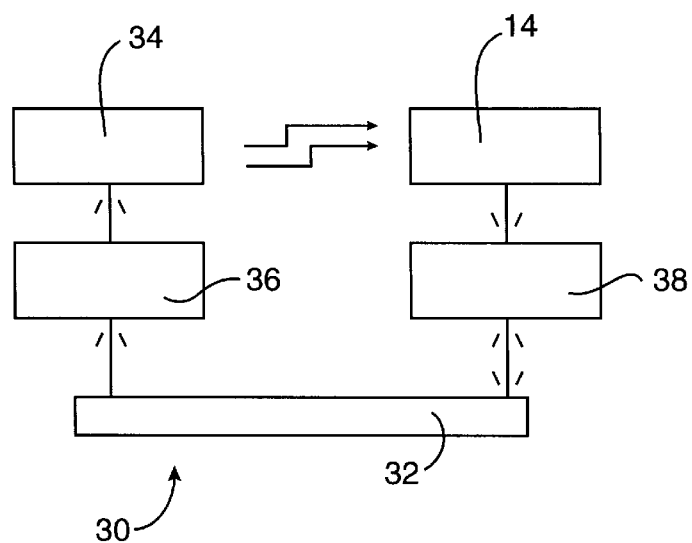
FIG. 3 is a schematic representation of a subsystem of the preferred embodiment of the present invention.
Figure 10:
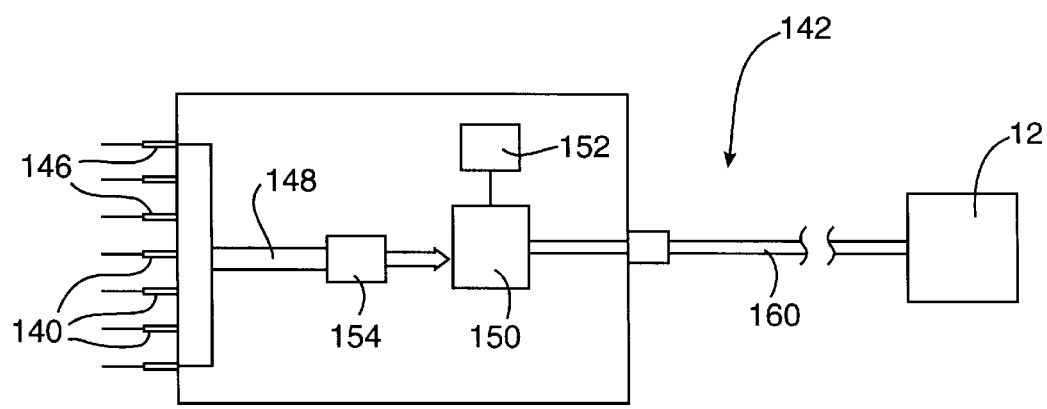
FIG. 10 is a schematic view showing a data collecting unit of the preferred embodiment of the present invention.

Referring now to FIGS. 1–3 of the drawings, the preferred embodiment of the invented body suit 10 includes a garment 22 that is configured to inhibit relative movement between the wearer 20 and garment 22. The garment 22 may include an upper body suit or jacket as shown in the drawings, or may comprise a complete body suit, that substantially covers the torso 24, arms 26, and legs 28 of the wearer 20, or may compromise of a vest and separable sleeving. The garment 22 is preferably fabricated from a suitable elastic textile, such as spandex or super-spandex for example. Such a textile prevents the garment from moving about on the wearer 20, while allowing substantial freedom of movement for the wearer 20.

A subsystem 30 is also provided for determining position and orientation of the garment 22, and thus the wearer 20, in space. The subsystem 30 determines an absolute position of the wearer 20 relative to a selected point of reference, such as a position and orientation data processing means, (computer) 32. Such a point of reference may be used to control and coordinate with the position of a character in a virtual reality scene, for example.

The subsystem 30 includes a computer 32 coupled to a transmitter 34 via drive electronics 36. The drive electronics 36 provide pulses to the transmitter 34 to generate output pulsed electromagnetic signals to receivers. Subsystem 30 creates a first group of sensors 14.

The receivers 14 are coupled to the computer 32 via signal processing means 38 to provide data to the computer 32 that indicates the position of the sensors 14. The data from the sensors 14 is processed by the computer 32 and compared to initial default data to determine any movement of the receivers 14 relative to a desired point of reference.

The subsystem 30 preferably includes a known 6 degree of freedom of movement system, wherein the wearer 20 has 6 degrees of freedom of movement relative to a point of reference, such as the transmitter 34 or computer 32. Suitable systems are disclosed in U.S. Pat. No. 4,945,305; and U.S. Pat. No. 5,600,330; each of which are incorporated herein by reference. These subsystems are sold under the tradename FLOCK OF BIRDS, manufactured by Ascension Technology Corporation, Burlington, Vt.

In the preferred embodiment, the receivers 14 are secured to the garment 22 at a number of preferred locations. These locations include a first sensor 14A secured to the sacral region 40 of the wearer's back. The first sensor 14A provides a reference point, or null position that measurements for each of the subsequent sensors 14 are based upon. Another sensor 14B is placed in the lumbar region 42 of the wearer's back. A sensor 14C is positioned on each of the wearer's elbows 44. A sensor 14D is secured to the frontal region 46 of each lower leg 48 of the wearer 20, and a sensor 14E is secured to the wearer's head 49.

The position and change in position of the sensors 14B, 14C, 14D, 14E relative to the null sensor 14A, is determined and processed by the signal processing means 36. The information is then transmitted to the computer 32. For example, if the position of the lumbar sensor 14B changes position relative to the null sensor 14A, such as by the wearer 20 bending over, the processing means 36 receives signals from the sensors 14, and transmits the data to the computer 32.

Referring now to FIGS. 1, 2, 4A, 4B, 7 and 9 of the drawings, there is shown the second group of sensors 16. In the preferred embodiment of the present invention 10, the second group of sensors 16 are bend sensors 16 which accurately track subtle body movements of the wearer's body, such as rotation of wrist articulation 50 or rotation of ankle articulation 100. The bend sensors 16 are affixed to the garment 22 at a number of different selected positions for monitoring movements of desired articulations of the wearer 20.

A first type of bend sensor 16A, referred to as a single axis bend sensor, is configured to monitor articulations along a single arbitrary axis for monitoring extension and flexion type body movements, such as the articulations of the elbow 44 and wrist 50 flexion movements. The single axis bend sensor 16A includes a signal generating section 54 and a sensing section 56. The signal generating section 54 includes a housing 58 affixed to a mounting plate 60. The plate 60 and housing 58 preferably include an electrically inert, rigid material, such as polyvinyl chloride (PVC) to prevent the plate 60 and housing 58 from generating electrical noise. The housing 58 is mounted on the plate 60.

An appropriate signal generating means 62 is coupled to the sensing section 56 and affixed to the housing 58. The signal (generating means 62 preferably includes a voltage varying device, such as a commercially available transducer or potentiometer. A suitable transducer 62 is manufactured by Bourns Instruments, Inc., of Riverside, Calif.

The sensing section 56 includes a sensor cable 64 coupled to the transducer 62. A flexible support cable 66 is provided for supporting the sensor cable 64. The support cable 66 is provided to control flexure of the sensor cable 64 by maintaining the curvature of the sensor 64 along a selected axis and to prevent inadvertent flexure or crimping of the cable 64.

A guide tube 68 is disposed over the support cable 66 and interposed between the cables 66, 64 to allow relative longitudinal movement therebetween. The guide tube 68 preferably comprises a resilient material, such as extruded nylon, and has a smooth inner surface 70 to allow the support cable 66 to move freely about therein. The support cable 66 has a diameter of approximately ¼ inch and preferably comprises a flexible metal alloy, such as brass.

The support cable 66 and guide tube 68 are disposed in an opening 72 in the housing 58 and are secured therein to couple the cable 66 and tube 68 to the housing 58. The support cable 66 and guide tube 68 are secured to the housing 58 to prevent the sensing section 56 from detaching from the signal generating section 54.

A plurality of annular sensor guides 74 are affixed to the periphery of the guide tube 68 and aligned with a vertical axis Y. The sensor guides 74 comprise a smooth, low coefficient of friction material, such as nylon or polytetrafluoroethylene, that enables the sensor cable 64 to move freely within the guides 74. This allows flexure of the sensing section 56, while preventing latitudinal movement of the sensor 64 relative to the support cable 66.

Figure 7:
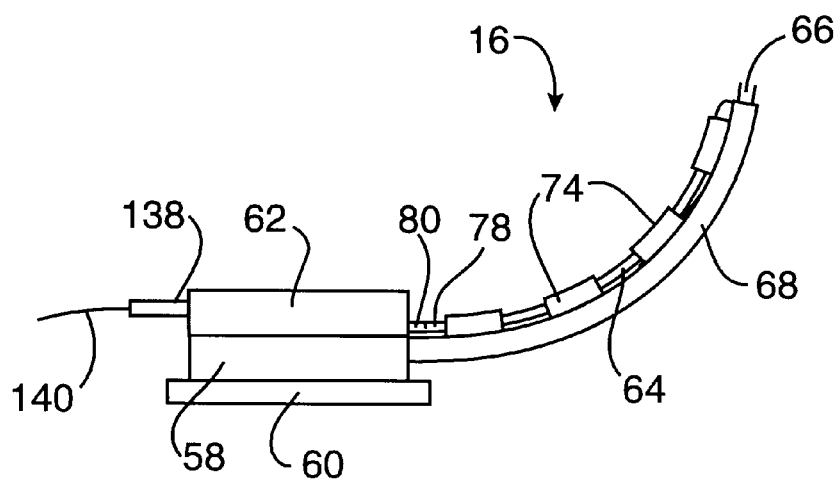
FIG. 7 is a plan view showing flexure of a second type of bend sensor of the present invention.
Figure 8:
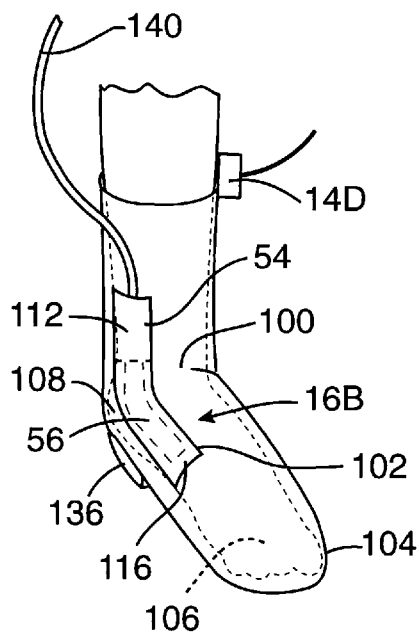
FIG. 8 is a perspective cross-sectional view showing a second type of bend sensor of the preferred embodiment of the present invention monitoring an ankle articulation.

The sensor cable 64 preferably comprises a suitable metal alloy cabling, such as steel, and is approximately 1/32 inch in diameter. The sensor 64 extends through the guides 74 and has an end 78 affixed to an actuator shaft 80 of the transducer 62. The transducer 62 is preferably coupled to the housing 58 to maintain the alignment of the sensor 64 with the desired axis. Thus, the transducer 62 is preferably coupled to a side wall 82 or top wall 84 of the housing 58. As shown in FIG. 7, the transducer 62 is affixed to the top wall 84 of the housing 58 to maintain the alignment of the sensor 64 with the vertical Y axis.

The shaft 80 of the transducer 62 is longitudinally movable for allowing the sensor cable 64 to actuate the transducer 62. Any flexure of the sensing section 56 of the single axis sensor 16A, causes flexure of the sensor cable 64 and longitudinal movement thereof along the support cable 66. As the sensor 64 moves along the support cable 66, the sensor 64 longitudinally moves the shaft 80 for actuating the transducer 62.

Any flexure of the sensor 64 is sufficient to cause the sensor 64 to actuate the transducer 62, so that the transducer 62 generates signals to indicate flexure of the sensor 64 and degree of flexure. Additionally, any change in flexure of the sensor 64 causes the transducer 62 to generate signals that correspond in amplitude to the degree of flexure of the sensor 64. When the sensor 64 is maintained at a desired degree of flexure, the amplitude of the signal output by the transducer 62 does not change, indicated that the sensor 64 is not moving.

The single axis bend sensors 16A are preferably affixed to the garment 22 along the lateral side of the elbow 44 and traverse the lateral side of the wrist 50. The bend sensor 16A monitoring wrist flexion is positioned on the garment 22, so that the sensing section 56 traverses the wrist articulation 50 for monitoring flexion and extension. Preferably, the sensing section 56 of the sensor 16A extends from the ulnar region of the forearm 88, traverses the wrist, and terminates along the ulnar border 90 of the palm of the hand 92.

Movement of the wrist and elbow articulations 50, 44, such as movement of the forearm 88 relative to the upper arm 26 causes flexure of the sensor cable 64 for actuating the transducer 62 coupled thereto. Any flexure of the sensor cable 64, causes the cable 64 to actuate the transducer 62 for transmitting signals of a corresponding amplitude which indicates the degree of flexure of the sensor cable 64.

In the preferred embodiment of the system of the present invention 10, the sensors 16A are secured in pockets 94 affixed to the garment 22, to inhibit relative movement between the sensors 16 and the articulation being monitored. The pockets 94 preferably include a first compartment 96 configured to secure the signal generating section 54 of the sensor 16A therein. A second compartment 98 of the pocket 94 is provided for retaining the sensing section 56 of the sensor 16A. The second compartment 98 is configured to allow longitudinal movement of the sensing section 56, without lateral movement thereof, to prevent the generation of erroneous errors by the sensors 16A.

Referring now to FIGS. 1, 2, 5A, 5B, and 8 of the drawings, a second type of bend sensor 16B, referred to as a two axis bend sensor, is provided for monitoring movements along two axes. This type of sensor monitors two axis articulation, such as ankle articulation 100. For simplicity, the two axis bend sensor 16B essentially comprises a single axis bend sensor 16A, with the inclusion of an additional transducer 62B and sensor cable 64B.

The signal generating section 54 of the two axis bend sensor 16B includes the housing 58 mounted on the mounting plate 60 as previously discussed. A first transducer 62A is mounted on the top wall 84 of the housing 58, similar to the single axis sensor 16A, for generating signals indicating flexure in a first axis, such as the "Y" axis. An additional transducer 62B is mounted to a side wall 82 of the housing 58 for generating signals indicating flexure in a second "X" axis, that is preferably substantially perpendicular to the Y axis.

The sensing section 56 includes the support cable 66 which supports the first sensor cable 64A aligned with the Y axis and a second sensor cable 64B aligned with the X axis. Each of the cables 64A, 64B is coupled to the actuator shaft 80A, 80B, of their respective transducers 62A, 62B using known means, such as soldering or welding. A first set of annular sensor guides 74A are affixed to the periphery of the guide tube 68 for aligning the first sensor cable 64A with the vertical Y axis and a second set of guides 74B are affixed to the tube 68 for maintaining the alignment of the second sensor cable 64B with the X axis.

Any flexure of the sensing section 56 along the Y axis causes flexure of the first sensor 64A to actuate the first transducer 62A for generating signals indicating flexure of a monitored articulation. Any flexure of the sensing section 56 along the X axis causes flexure of the second sensor 64B inducing longitudinal movement thereof along the support cable 66. As the sensor 64B moves along the support cable 66, the sensor 64B longitudinally moves the shaft 80B of the second transducer 62B and actuates the transducer 62B. Any flexure of greater than approximately three degrees of the sensor cable 64B is sufficient to cause the sensor 64B to actuate the transducer 62B, so that the transducer 62B generates signals to indicate flexure of the sensor 64B and degree of flexure thereof. Additionally, simultaneous flexure of the sensing section 56 along both axes Y, X causes actuation of both transducers 62A, 62B for generating signals indicating movement of the monitored articulation.

The two axis bend sensor 16B of the preferred embodiment of the present invention 10 is provided to monitor the ankle articulation 100. Preferably, the bend sensor 16B is retained in a pocket 102 affixed to a boot 104 worn on the wearer's foot 106. The pocket 102 is affixed to the boot 104 and configured to traverse the ankle articulation 100 along the medial aspect 108 thereof and terminates on the dorsal region 110 of the boot 104, and thus the wearer's foot 106. The mounting plate 60 of the sensor 16B is retained in a first compartment 112 of the pocket 102 located on the medial region 114 of the lower leg 48. A second compartment 116 of the pocket 102 traverses the medial aspect 108 of the ankle 100 and terminates on the dorsal region 110 of the boot 104. As previously discussed, the second compartment 116 is configured to allow longitudinal movement of the sensing section 56, without lateral movement to prevent the sensors 16B from generating erroneous signals.

Figure 6:
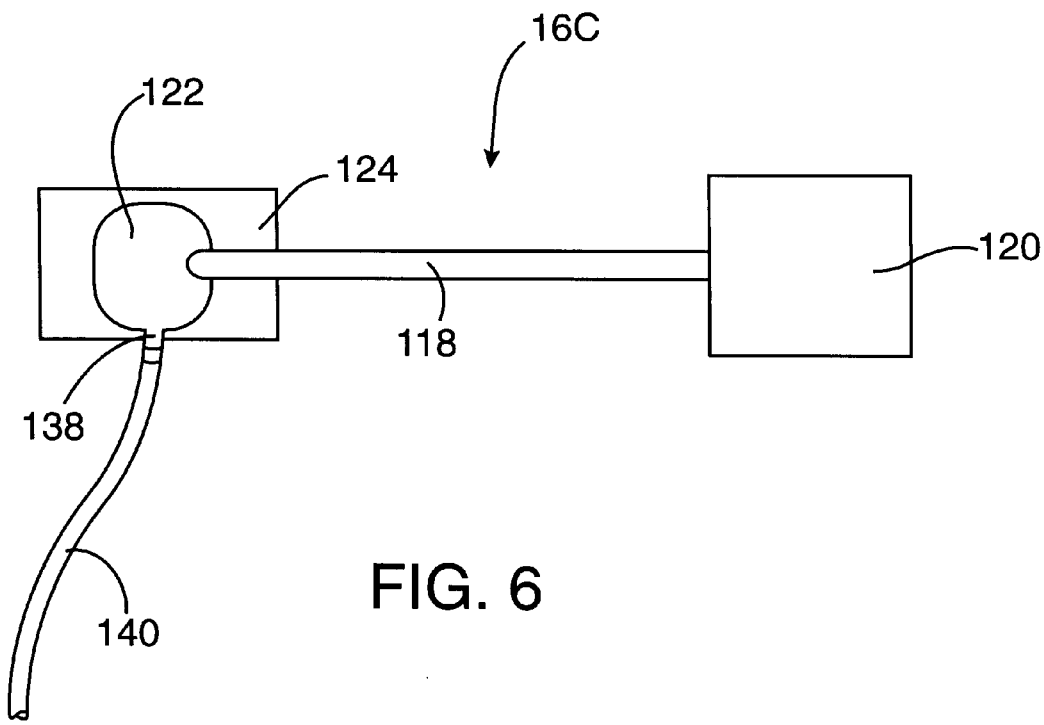
FIG. 6 is a plan view of a third type of bend sensor of the preferred embodiment of the present invention.
Figure 9:
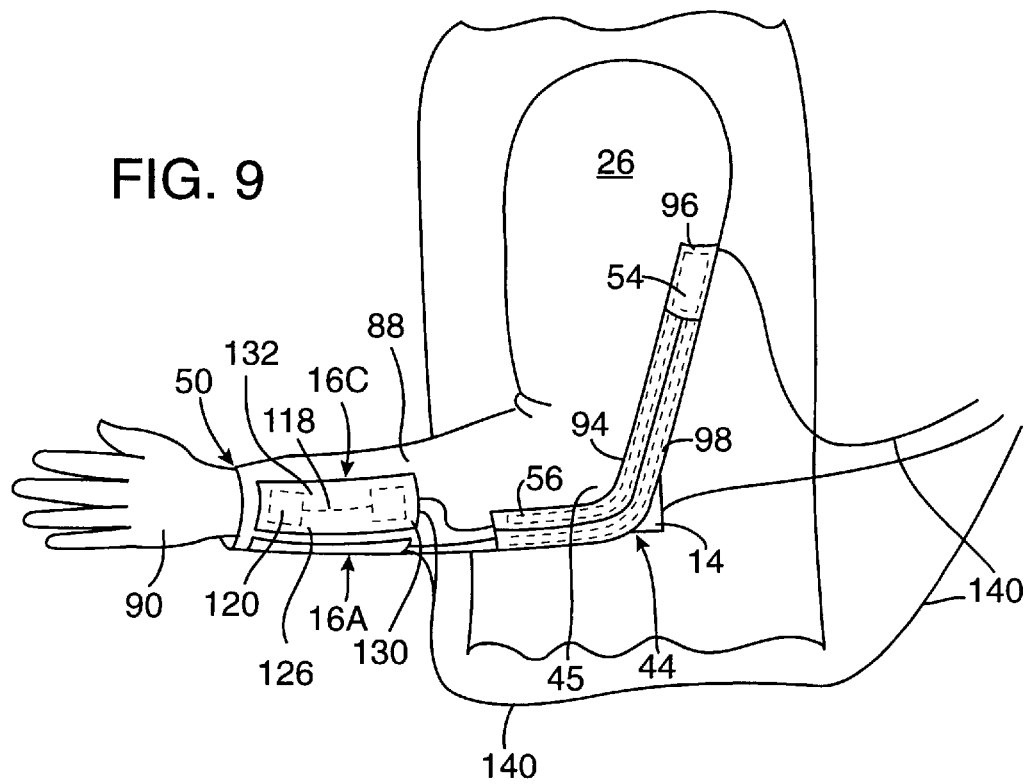
FIG. 9 is a perspective cross-sectional view showing a plurality of bend sensors of the preferred embodiment of the present invention monitoring the articulations of the arm of a wearer.

Referring now to FIGS. 2, 6, and 9 of the drawings, a third type of bend sensor 16C, referred to as a twist sensor, is configured for monitoring supination and pronation articulations, and is well suited for monitoring rotation of the wrist articulation 50. The twist sensor 16C includes a flexible connecting cable 118 connected to a rectangular, planar blade portion 120 and to a voltage varying device 122 mounted on a plate 124, for coupling the blade 120 to the device 122. The voltage varying device 122 may comprise any suitable device, such as a potentiometer or transducer, for controlling the amplitude of signals generated by the sensor 16B. The twist sensor 16C is retained in a pocket 126 that is affixed to the garment 22 along the dorsal region 128 of the forearm 88.

The pocket 126 has a first compartment 130 configured to retain the plate 124 and potentiometer. A second compartment 132 of the pocket 126 extends along the dorsal region 128 of the forearm 88 and terminates proximal to the wrist articulation 50. The connecting cable 118 extends from the first compartment 130, along the second compartment 132 and terminates proximal to the wrist articulation 50 for positioning the blade 120 at the wrist 50. Any rotation of the wrist 50, such as supination or pronation, rotates the sensor's blade 120, thus rotating the connecting cable 118. As the cable 118 is rotated, the potentiometer 122 is rotated to increase or decrease the resistance value and adjusting the amplitude of signals output from the sensor 16C to provide signals of varying amplitude to indicate rotation of the wrist 50.

The bend sensors 16A, 16B and twist sensors 16C accurately track subtle movements in each of the monitored articulations 44, 50, 100. Flexure of the articulation causes corresponding flexure of the sensing cables 64, or rotation of the blade 120 of the wrist sensor 16C, to actuate the associated voltage varying device, such as the transducers 62 or potentiometer 122, to generate signals indicating movement of the monitored articulation. As the flexure of the articulation increases, the transducers 62 and potentiometer 122 generate signals of increasing amplitude to indicate increase of the flexure of the articulation. When the flexure is maintained, the amplitude of the movement indicating signals stabilizes to indicate that the position of the monitored articulation is unchanged. Any further flexure of the articulations, such as an increase or decrease the flexure, causes the amplitude of the signals transmitted by the transducers 62 or potentiometer 122 to change correspondingly and generate data that accurately depicts the position of the articulation.

Referring now to FIG. 1 and FIG. 2 the third group of sensors 18 is provided to determine when a wearer's feet 106 are touching a ground surface 134, for determining if the wearer 20 is walking or standing. The sensors 18 preferably comprise commercially available pressure sensors 18 and are positioned in a heel 136 of each boot 104. Any pressure exerted by the foot 106 of the wearer 20, such as when the wearer 20 is walking, causes the sensor 18 to transmit signals that indicate the wearer 20 is walking.

Referring now to the drawing Figures, outputs 138 of each of the transducers 62, potentiometers 122, and pressure sensors 18 are coupled to a data cables 140 for transmitting signals generated by the sensors 16, 18 to a data collecting unit 142. In the preferred embodiment, the data collecting unit 142, is preferably secured to a back 144 of the garment 22 along the lumbar region 42 of the wearer's back. The data collecting unit 142 receives signals generated by each of the bend sensors 16 and pressure sensors 18 and processes the signals for transmitting movement indicating data to the computer 12.

The data collection unit 142 includes a plurality of inputs 146 coupled each of the data cables 140 from the sensors 16, 18 for receiving the movement indicating signals therefrom. The inputs 146 are coupled to a data bus 148 that transmits the signals to a processor 150 for processing the signals. The first signal processing step typically comprises removing unwanted noise from the movement indicating signals received by the unit 142. The unit 142 includes a low-pass filter means which may comprise a program stored in a known integrated circuit memory device 152 coupled to the processor 150, or the filter means may comprise known circuitry (not shown).

An analog-to-digital (A-D) signal converter 154 provides a representative data value for each of the signals generated by the bend sensors 16 and pressure sensors 18. The A-D converter 154 may have an input 156 coupled to the data bus 148 to receive analog signals and have an output 158 coupled to the processor 150 for providing the processor 150 with digital data representing the movement indicating signals. Alternatively, the A-D converter 154 may comprise a program stored in the memory device 152 and invoked by the processor, or may comprise a portion of the processor 150 itself.

After the analog signals are converted to digital values, the data is normalized to provide signals indicating actual movement of the articulations of the wearer 20. The data is normalized to calibrate the bend sensors 16 to accommodate varying ranges of motion, for example, of different wearers of the invented system 10. The calibration procedure enables the transducers 62 and potentiometer 122 to provide signals to the data unit 142 within a desired arbitrary data range for determining the range of motion of the monitored articulations.

The sensors 16 are calibrated by first inducing flexure in a sensor to be calibrated in a first direction, such as extension of the wrist 50. The transducer 62 coupled to the sensor 16A generates a signal of a measurable amplitude. The signal is then transmitted to the data unit 142 and assigned a first digital value. Flexure in a second direction, such as flexion of the wrist 50, is induced to cause the transducer 62 to generate a second signal of a measurable amplitude. The signal is then transmitted to the data unit 142 and assigned a second digital value, that is substantially greater or less, as desired, from the first data value, to provide a data range therebetween. The data range between the first and second data values should be sufficiently large for enabling the data unit 142 to transmit data representative of the wearer's movements to the computer 12 for enabling the object in the program running on the computer 12 to have body movements that mimic the body movements of the wearer 20 of the garment 22 as the wearer 20 is moving.

The normalized data is then transmitted to the computer 12 via suitable means such as a data cable 160 or transceivers (not shown) as is known in the art. A cable guide 161, such as a flexible conduit 161, may be provided to reduce electrical interference between the components of the invented system 10. The data cable 160 may be a serial cable or other data transmission cable as is known in the art. As data is transmitted from the data unit 142 to the computer 12, data may be transmitted from the position and orientation computer 32 to the main computer 12, via a data cable 162, for processing data from the data unit and computer 32 simultaneously. The data from the data unit 142 is fed into the computer 12 for processing while the position and orientation data is processed. The data is processed in real time for controlling a program, such as a virtual reality program, running on the computer 12.

Thus, the plurality of movement indicating sensors of the preferred embodiment of the invented system generate data indicative of any movements of the wearer. Movements by the wearer, including wrist, arm, and foot movements are transmitted to the main computer for processing data generated by the suit in real time. The movement indicating data is continuously processed so that an object, such as a character in a virtual reality program running on the computer, has body movements analogous to the movements of the wearer, such as an actor, as the wearer is moving.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A system for tracking body movements comprising:

sensing means for monitoring body articulations, the sensing means positioned on and traversing a body articulation for monitoring movement;

sensing means for determining ambulation and absence thereof;

signal generating means coupled to the sensing means, the signal generating means generating signals representative of the movement of the body articulations and ambulation;

processing means for processing signals generated by the generating means; and means for transmitting the movement indicating data to a computing means for manipulating the data.

2. The system of claim 1 further comprising securing means for coupling the sensing means to an articulation to be monitored and coupling the sensing means for determining ambulation and inhibiting relative movement therebetween.

3. The system of claim 2 wherein the sensing means comprises flexible members coupled to the securing means and positioned to traverse selected articulations to be monitored, wherein any flexion of a monitored articulation causes an analogous degree of flexure of the flexible member traversing the articulation, the sensing means actuating the signal generating means coupled thereto for causing the generating means to generate signals of an amplitude representative of the degree of flexion of the articulation.

4. The system of claim 3 wherein a plurality of sensing means are provided for monitoring a plurality of articulations, the articulations to be monitored selected from the group consisting of elbow articulation, wrist articulation, and ankle articulation.

5. The system of claim 4 wherein the processing means comprises a data collection unit secured to the securing means, the data unit coupled to each of the signal generating means to generate data indicative of movement in each of the monitored body articulations and the monitored ambulatory sensors, the data unit including means for calibrating the sensing means and means for transmitting the movement indicating data to the computing means for manipulating the data.

6. The system of claim 1 wherein the movement indicating data is processed by the computing means for controlling an object in a program running on the computing means, the object having body movements representative of the movement indicating data generated by the movements of monitored body articulations and monitored ambulatory movements and absence thereof.

7. A system for tracking body movements comprising:
a device for determining position and orientation of a body in space comprising:
a plurality of receivers for receiving signals, the receivers secured to a garment extending over a wearer,
a transmitter means for transmitting signals to the receivers,
a position and orientation processing means for generating data to indicate the position and orientation of the receivers relative to the transmitter means, the processing means processing signals received from the receivers to provide data indicating the position and orientation of the body of the wearer of the garment in space;
sensing means for monitoring movement of a plurality of body articulations, the sensing means secured to the garment for positioning the sensing means on a body articulation to be monitored, the sensing means traversing the monitored articulation to monitor flexion thereof;
sensing means for determining ambulatory movement and absence thereof;
signal generating means coupled to the sensing means for generating signals proportional to the degree of flexure of the sensing means, the sensing means actuating the signal generating means to indicate flexion of a monitored articulation and to indicate ambulatory movement and absence thereof;
data collection means for receiving signals generated by the generating means, the data collection means secured to the data suit and coupled to the signal generating means for processing signals received therefrom to generate data indicative of degree of flexion in each of the monitored body articulations; and
computing means for processing data received from the data collection means and the processing means to control the movements of an object a program running thereon.

8. The system of claim 7 further comprising:
the garment closely fitting the wearer for inhibiting relative movement between the sensors and the monitored articulations, and
the sensing means comprising a plurality of sensors secured to the garment and positioned along selected articulations of the body of the wearer for monitoring movement of the articulations, each of the sensors including an elongated flexible member coupled to the signal generating means and dimensioned to traverse the monitored articulation, wherein any flexion of the articulation causes flexure of the member for causing the sensor to actuate the signal generating means for generating signals proportional to the degree of flexion of the articulation.

9. The system of claim 8 wherein the sensing means comprises a single axis bend sensor for monitoring selected articulations of the body of the wearer including the elbow articulation and wrist articulation, the single axis bend sensor configured to monitor extension and flexion body articulations, the single axis bend sensor including a flexible sensing cable coupled to the signal generation means for actuation thereof to indicate flexure of the cable, and thus flexion of the monitored articulation.

10. The system of claim 8 wherein the sensing means comprises a two axis bend sensor, the two axis bend sensor including a pair of sensing cables that traverse the ankle articulation, a first one of the cables monitoring flexion and extension articulations and a second one of the cables monitoring medial and lateral articulations of the foot about the ankle articulation, each of the cables coupled to the signal generation means for actuation thereof to indicate any flexure of the cable, and thus flexion of the ankle articulation.

11. The system of claim 10 wherein the first and second cables of the two axis bend sensor extend generally downwardly along the leg, traverse the medial region of the ankle articulation, and terminate along dorsal region of the foot.

12. The system of claim 8 wherein the sensing means comprises a twist bend sensor for monitoring wrist supination and probation, the twist sensor having a planar end portion positioned proximal to the wrist of the wearer for monitoring movement thereof and an end coupled to the signal generating means, wherein supination and pronation of the wrist rotates the end portion of the twist sensor for causing the signal generating means to generate signals of varying amplitude to indicate rotation of the wrist.

13. The system of claim 7 further comprising:
pressure sensing means for determining when the wearer of the garment is ambulatory and standing and for generating signals to indicate that the wearer is a determined one of walking and standing.

14. A system for tracking body movements comprising:
a garment configured to inhibit relative movement between a wearer and the garment, the garment configured to extend at least over the arms of the wearer;
a body position and orientation subsystem for determining the position and orientation of the body of the wearer of the garment in space, the subsystem comprising,
a plurality of receivers secured to the garment at a number of selected locations,
transmitter means for transmitting signals to the receivers,
position and orientation processing means for generating data to indicate the position and orientation of the receivers relative to the transmitter means, the processing means processing signals received from the receivers to provide data indicating the position and orientation of the body of the wearer;

a plurality of sensing means for monitoring flexion of a plurality of body articulations, the sensing means secured to the garment to prevent relative movement between the sensing means and monitored articulations for inhibiting erroneous data from being generated, the sensing means secured to the garment at a number of different selected locations for monitoring flexion of a plurality of body articulations, the sensing means including an elongated flexible sensor dimensioned to traverse a desired articulation so that flexion of the articulation causes a proportional flexure of the flexible sensor to indicate flexion of the articulation;

a plurality of signal generating means, one generating means coupled to each sensing means, the signal generating means generating signals proportional to the degree of flexure of the sensor to indicate degree of flexion of the monitored articulation;

pressure sensing means for determining when the wearer of the garment is walking and standing, the pressure sensing means coupled to signal generating means for generating signals to indicate that the wearer is a determined one of walking and standing;

a data collection unit secured to the garment, the data unit coupled to the signal generating means for receiving signals generated thereby, the data unit processing received signals to generate data indicative of flexion in each of the monitored body articulations and for determining that the wearer is a selected one of walking and standing, the data collection unit including filter means for removing extraneous signal noise and signal normalization means for inhibiting erroneous generation of data thereby; and computing means for processing data generated by the data collection unit and data generated by the processing means to control the movement of an object in a program running thereon.

15. The system of claim 14 wherein the computing means processes the flexure indicating data generated by the data collection unit and the position and orientation data generated by the subsystem for enabling the object in the program running on the computing means to have body movements that mimic the body movements of the wearer of the garment as the wearer is moving.

16. The system of claim 14 wherein any flexion of a monitored articulation induces sufficient flexure of the elongated flexible sensor of the sensing means monitoring the articulation to cause the sensing means to actuate the signal generating means coupled thereto for generating a signal to indicate flexion of the articulation, the signal generating means generating signals of amplitudes representative of the degree of flexion of the articulation.

17. The system of claim 14 wherein each of the signal generating means comprises a transducer coupled to each of the elongated flexible sensors, the transducers generating signals indicating flexion of the monitored articulation, wherein as the flexure of the flexible sensors increases, the sensors continue to actuate the transducers for generating signals of increasing amplitude for indicating the continued increase of the flexure thereof, and wherein when the flexure of the sensors is maintained, the amplitude of the signals generated by the transducers stabilizes to indicate that the position of the monitored articulation is unchanged, and wherein further flexure of the flexible sensors causes the amplitude of the signals generated by the transducers to change correspondingly, for generating data indicative of the position of the articulation and any movement thereof.

18. The system of claim 14 wherein the sensing means comprises a single axis bend sensor for monitoring selected articulations of the body of the wearer including the elbow articulation and wrist articulation, the single axis bend sensor configured to monitor extension and flexion body articulations, the single axis bend sensor including a flexible sensing cable coupled to the signal generation means for actuation thereof to indicate flexure of the cable, and thus flexion of the monitored articulation.

19. The system of claim 14 wherein the sensing means comprises a two axis bend sensor, the two axis bend sensor including a pair of sensing cables that traverse the ankle articulation, a first one of the cables monitoring flexion and extension articulations and a second one of the cables monitoring medial and lateral articulations of the foot about the ankle articulation, each of the cables coupled to the signal generation means for actuation thereof to indicate any flexure of the cable, and thus flexion of the ankle articulation.

20. The system of claim 14 wherein the sensing means comprises a twist bend sensor for monitoring wrist supination and pronation, the twist sensor having a planar end portion positioned proximal to the wrist of the wearer for monitoring movement thereof and an end coupled to the signal generating means, wherein supination and pronation of the wrist rotates the end portion of the twist sensor for causing the signal generating means to generate signals of varying amplitude to indicate rotation of the wrist.

21. The system of claim 14 wherein the data collection unit comprises:

a housing secured to the back of the garment;

signal coupling means for coupling the unit to each of the plurality of signal generating means;

noise filter means for removing noise from signals received from the signal generating means;

means for converting analog signals generated by the signal generating means to a digital level;

means for calibrating the sensing means to enable the signal generating means to provide signals to the unit within a desired data range; and means for coupling the data collection unit to the computing means for transmitting data thereto.

22. The system of claim 21 wherein data is transmitted to the computer via a data cable at a substantially high transmission rate.

23. The system of claim 21 wherein the means for calibrating the sensing means to enable the signal generating means to provide signals to the unit within a desired data range comprises a calibration method, the method comprising the following steps:

inducing flexure in a first direction in at least one sensing means to be calibrated, the flexure of the sensing means causing the signal generating means to generate a first proportional signal;

sensing the first proportional signal generated by the generating means to obtain a first maximum value;

assigning a first digital value to the first maximum value;

inducing flexure in a second direction in the sensing means being calibrated, the flexure of the sensing means causing the signal generating means to generate a second proportional signal;

sensing the second proportional signal generated by the generating means to obtain a second maximum value; and assigning a second digital value to the first maximum value, the second digital value being a desired one of substantially greater and substantially less than the first digital value to provide a data range therebetween, the data range sufficiently large for enabling the data collection unit to transmit data representative of the wearer's movements to the computing means for enabling the object in the program running on the computing means to have body movements that mimic the body movements of the wearer of the garment as the wearer is moving.

* * * * *